Sept. 24, 1940.  W. A. DUFFIELD  2,215,548

ONE-WAY BRAKE

Filed Oct. 1, 1937

INVENTOR
William A. Duffield
BY
Nanbury A. Gadden
ATTORNEY

Patented Sept. 24, 1940

2,215,548

UNITED STATES PATENT OFFICE 2,215,548

ONE-WAY BRAKE

William A. Duffield, Windsor, Ontario, Canada, assignor to Modern Equipment Limited, Montreal, Quebec, Canada, a company Application October 1, 1937, Serial No. 166,865

2 Claims. (Cl. 188—81)

This invention relates to brakes and particularly to one-way brakes.

The object of the invention is to provide a brake of this type which will be more efficient in action and more durable in operation.

It consists briefly in providing means to hold the rollers free from contact with the stationary element when the brake is free and the rotating element is released.

In the usual form of such brakes the rollers, when the brake is free, may still contact with the stationary element and be rotated thereby. This results in rapid wear of the rollers and grooving of the stationary element.

This invention prevents this deterioration.

Reference is made to the accompanying drawing in which—

Figure 1:
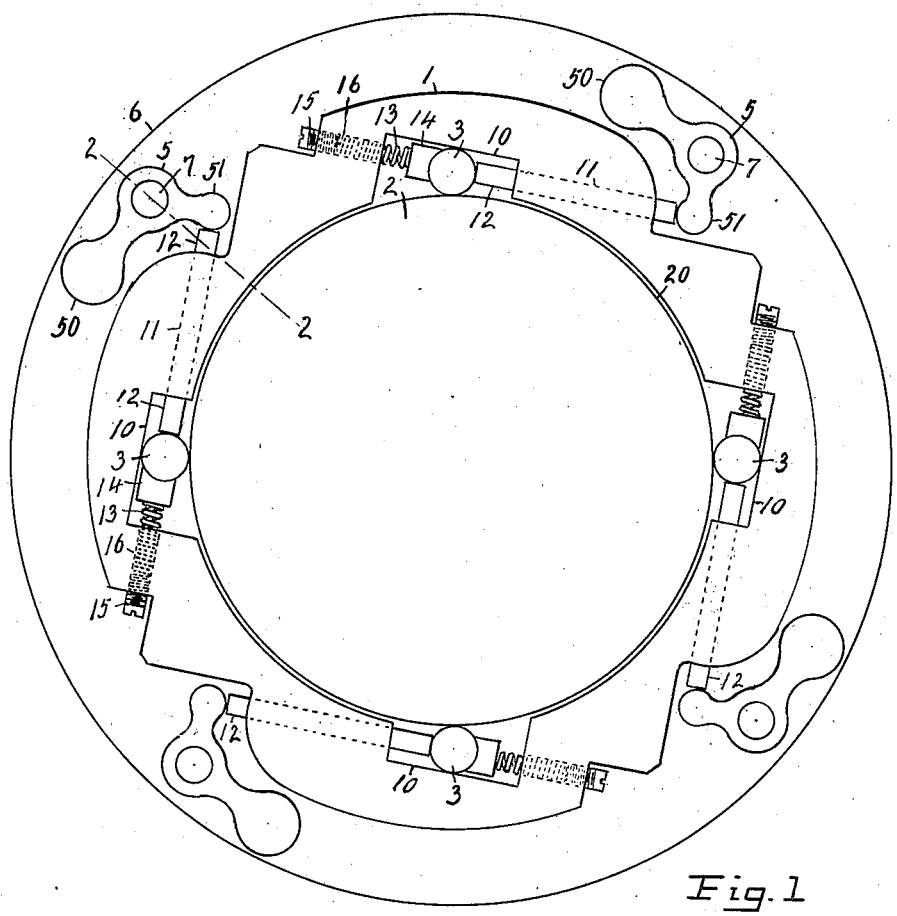
Figure 1 is a side view with side plate removed.
Figure 2:
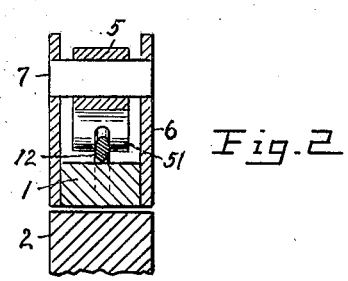
Figure 2 is a cross section on the line 2—2 of Figure 1.

In the drawing the ring 1 is the rotating element and has a series of tangential recesses 10 in which rollers 3 travel and bear on the surface 20 of a stationary member 2. The ring 1 is bored at 11 and 16 parallel with the top of the recess 10. In the bore 11 is a bar 12 contacting with the roller 3. The bore 16 has an adjustable screw 15 and a spring 13 bearing on a cupped block 14 against which the roller 3 turns. The ring 1 has side plates 6 having pins 7 on which are journalled levers 5 with weighted ends 50. The ends 51 bear on the ends of the rods 12.

The operation of the brake is like that of the ordinary form and provides a one-way brake. But when the brake is freed and the rollers are freed from their grip by the surfaces 10 and 20 in place of their being able to contact with the surface 20, the lever 5 pushes the rod 12, roller 3 and block 14 against the spring 15 and the roller 3 is held free from contact with the surface 20.

By this means when the brake is released, the rollers are held free from rotation and from contact with the surface 20 on which it bears when the brake is set. This prevents wear on the roller and grooving on the surface 20 and gives the brake a greatly extended life and more efficient operation.

The device is not designed as a free wheeling clutch but is simply a one-way brake adapted to hold the rotating element from reverse rotation and to provide absolute free running for that element in forward rotation when the brake is free.

Furthermore the device is not designed for the action of the weights to release the brake. The brake releases automatically and the weights act after the brake is released, to hold the rollers free.

What I claim is:

1. In a one-way brake, a rotating ring, having tangential recesses, a stationary member within the ring, rollers in the recesses, centrifugal means comprising weighted levers, journalled on pins in side plates to the ring, rods in tangential bores in the ring, between the levers and the rollers, and adjustable springs in bores in the ring axial with the tangential bores, and cupped blocks held against the rollers by the springs.

2. In a one-way brake, a rotating ring, having tangential recesses, a member normally held stationary within the ring, rollers in the recesses, tangential bores in the ring at each end of the recesses, rods in the bores at the narrow ends of the recesses, lever weights pivoted in the ring bearing on the ends of the rods, adjustable springs in the bores at the wide ends of the recesses supporting cupped blocks against the rollers.

WILLIAM A. DUFFIELD.